United States Patent
Bavelloni (10) Patent No.: US 7,571,801 B2
(45) Date of Patent: Aug. 11, 2009

(54) ASSEMBLY FOR CONVEYING GLASS SHEETS ON SHEET WORKING MACHINES

(75) Inventor: Franco Bavelloni, San Fermo Della Battaglia (IT)

(73) Assignee: Z. Bavelloni S.p.A., Bregnano (IT)

( * ) Notice: Subject to any disclaimer, the term of this patent is extended or adjusted under 35 U.S.C. 154(b) by 134 days.

(21) Appl. No.: 11/525,845

(22) Filed: Sep. 25, 2006

(65) Prior Publication Data

US 2007/0074952 A1 Apr. 5, 2007

(30) Foreign Application Priority Data

Sep. 30, 2005 (IT) .......................... MI2005A1851

(51) Int. Cl.
*B65G 49/06* (2006.01)
*C03B 33/03* (2006.01)

(52) U.S. Cl. ............... 198/817; 198/626.1; 83/266; 83/268; 83/276; 83/280

(58) Field of Classification Search ............. 198/626.1, 198/626.5, 817; 83/266, 268, 276, 280
See application file for complete search history.

(56) References Cited

U.S. PATENT DOCUMENTS

| | | | | |
|---|---|---|---|---|
| 3,850,213 A | * | 11/1974 | Keaton | 100/154 |
| 3,992,182 A | * | 11/1976 | Frank | 65/163 |
| 4,488,846 A | * | 12/1984 | Halberschmidt et al. | 414/152 |
| 4,493,412 A | * | 1/1985 | Krehnovi | 198/434 |
| 6,105,845 A | * | 8/2000 | Aebersold et al. | 228/4.1 |
| 6,152,292 A | * | 11/2000 | Matteucci et al. | 198/626.1 |
| 6,296,107 B1 | * | 10/2001 | Baumgartner-Pichelsberger | 198/626.6 |
| 6,557,689 B2 | * | 5/2003 | Gariglio | 198/345.1 |
| 6,810,784 B1 | | 11/2004 | Cunningham | |
| 2004/0094890 A1 | * | 5/2004 | Chiasson et al. | 271/205 |
| 2006/0154551 A1 | * | 7/2006 | Nakanishi | 445/24 |

FOREIGN PATENT DOCUMENTS

| | | |
|---|---|---|
| EP | 1 566 365 A | 8/2005 |
| EP | 1 580 150 A | 9/2005 |
| JP | 08 143323 A | 6/1996 |
| JP | 2004 026569 A | 1/2004 |
| JP | 2004 066636 A | 3/2004 |

\* cited by examiner

*Primary Examiner*—Mark A Deuble
(74) *Attorney, Agent, or Firm*—Modiano & Associati; Albert Josif; Daniel J. O'Byrne (57) ABSTRACT

An assembly for conveying glass sheets on machines for working sheets, comprising an assembly for feeding the sheets to be worked, which engages the longitudinal edges of the sheets and is arranged upstream of a frame for supporting at least one working head, and an assembly for removing the sheets, which engages the edges of the sheets and is arranged downstream of the frame for supporting a working head.

40 Claims, 9 Drawing Sheets

ASSEMBLY FOR CONVEYING GLASS SHEETS ON SHEET WORKING MACHINES

The present invention relates to an assembly for conveying sheets on machines for working sheets, particularly glass sheets and the like.

BACKGROUND OF THE INVENTION

As is known, glass sheets and the like are currently worked by using conveyance assemblies designed to feed the sheet below the working heads, which perform the required work.

According to the background art, the conveyance assembly is provided with presser rollers or belts, which engage the surface of the sheet and retain it during work; these means very often cause damage to the surface of the sheet, especially when working on glass sheets with a "LOW-E" type coating.

In order to try to solve this problem, solutions have already been introduced in which the conveyance assembly is provided by means of two pairs of belts arranged on opposite sides along the sheet advancement direction and retain the sheet only upstream of the work area.

One of such sides is typically fixed, while the other pair of belts can perform a translational motion so as to adapt easily to the width of the sheet.

Each pair of belts is formed by a belt which is fixed on the supporting surface and engages the lower side of the sheet, while the other belt can move vertically in order to engage the upper side so as to apply an adequate pressure which ensures the retention of the sheet during work.

With this type of conveyance assembly, it is possible to perform work only along the sides affected by the belts and with a single direction of advancement.

Another problem consists further in that it is not always possible to retain the sheet firmly, and therefore work imperfections and vibrations can occur which damage the tools and produce lower-quality work.

SUMMARY OF THE INVENTION

The aim of the invention is to solve the problems described above by providing an assembly for conveying sheets on machines for working sheets, particularly glass sheets and the like, which allows to work both along the edges of the sheet and on the surface of the sheet, with the additional possibility to move the working heads so that they work in both directions of advancement of the sheet.

Within this aim, an object of the invention is to provide a conveyance assembly which does not produce surface damage of the sheets, which are always retained perfectly, so that all work can be performed in an optimum manner.

Another object of the present invention is to provide a conveyance assembly which, thanks to its particular constructive characteristics, is capable of giving the greatest assurances of reliability and safety in use.

Still another object of the present invention is to provide an assembly for conveying sheets on machines for working sheets, particularly glass sheets and the like, which can be obtained easily starting from commonly commercially available elements and materials and is further competitive from a merely economical standpoint.

This aim and these and other objects, which will become better apparent hereinafter, are achieved by an assembly for conveying sheets on machines for working sheets, particularly glass sheets and the like, characterized in that it comprises an assembly for feeding the sheets to be worked, which engages the longitudinal edges of the sheets and is arranged upstream of a frame for supporting at least one working head, and an assembly for removing the sheets, which engages the longitudinal edges of the sheets and is arranged downstream of said frame for supporting a working head.

BRIEF DESCRIPTION OF THE DRAWINGS

Further characteristics and advantages will become better apparent from the description of a preferred but not exclusive embodiment of an assembly for conveying sheets on machines for working sheets, particularly glass sheets and the like, illustrated by way of non-limiting example in the accompanying drawings, wherein.

DESCRIPTION OF THE PREFERRED EMBODIMENTS

Figure 1:
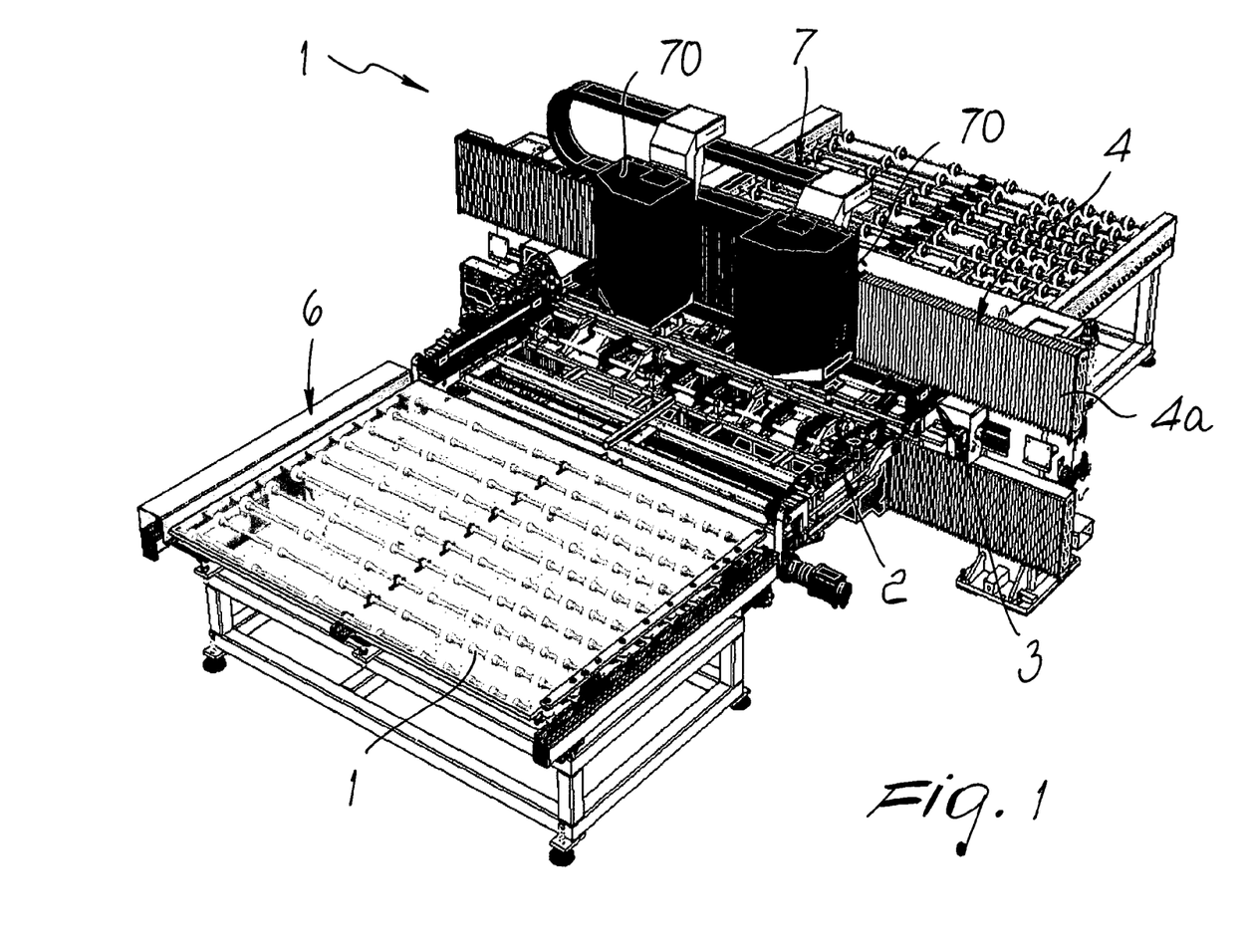
FIG. 1 is a schematic perspective view of the conveyance assembly according to the invention, applied to a machine for working the sheet.
Figure 2:
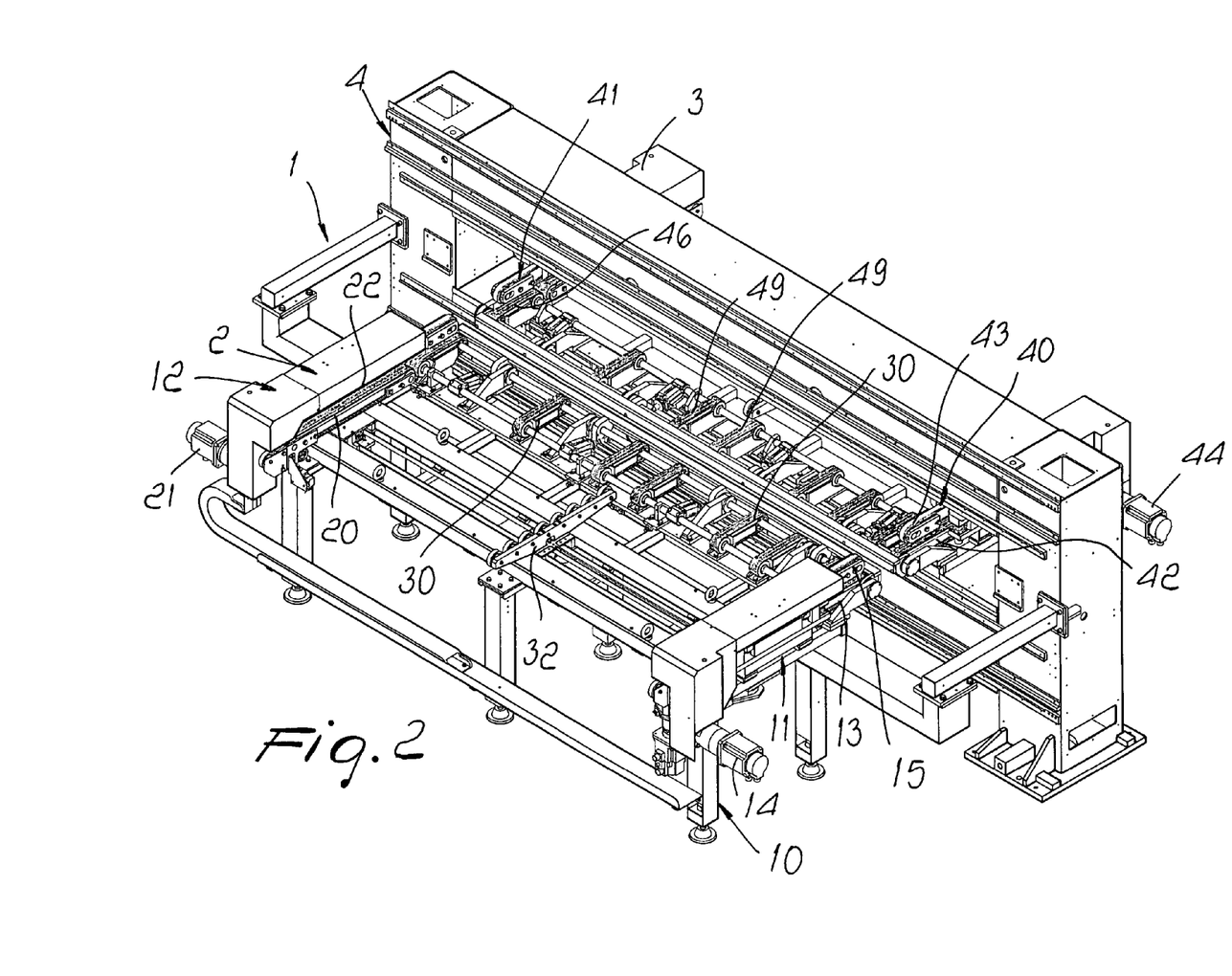
FIG. 2 is a schematic view of the conveyance assembly positioned with respect to the working head.
Figure 3:
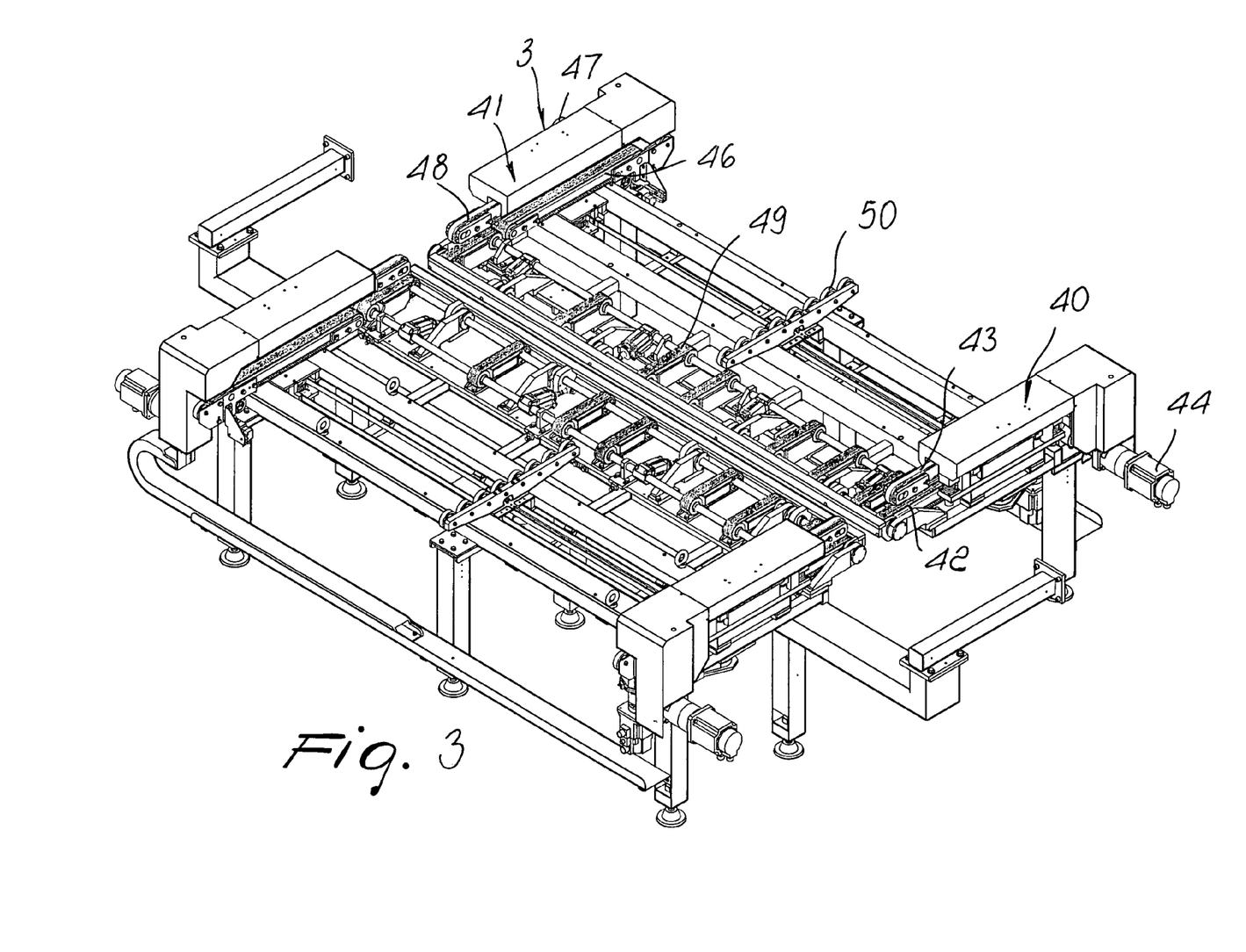
FIG. 3 is a schematic perspective view of the conveyance assembly with the working head removed.
Figure 4:
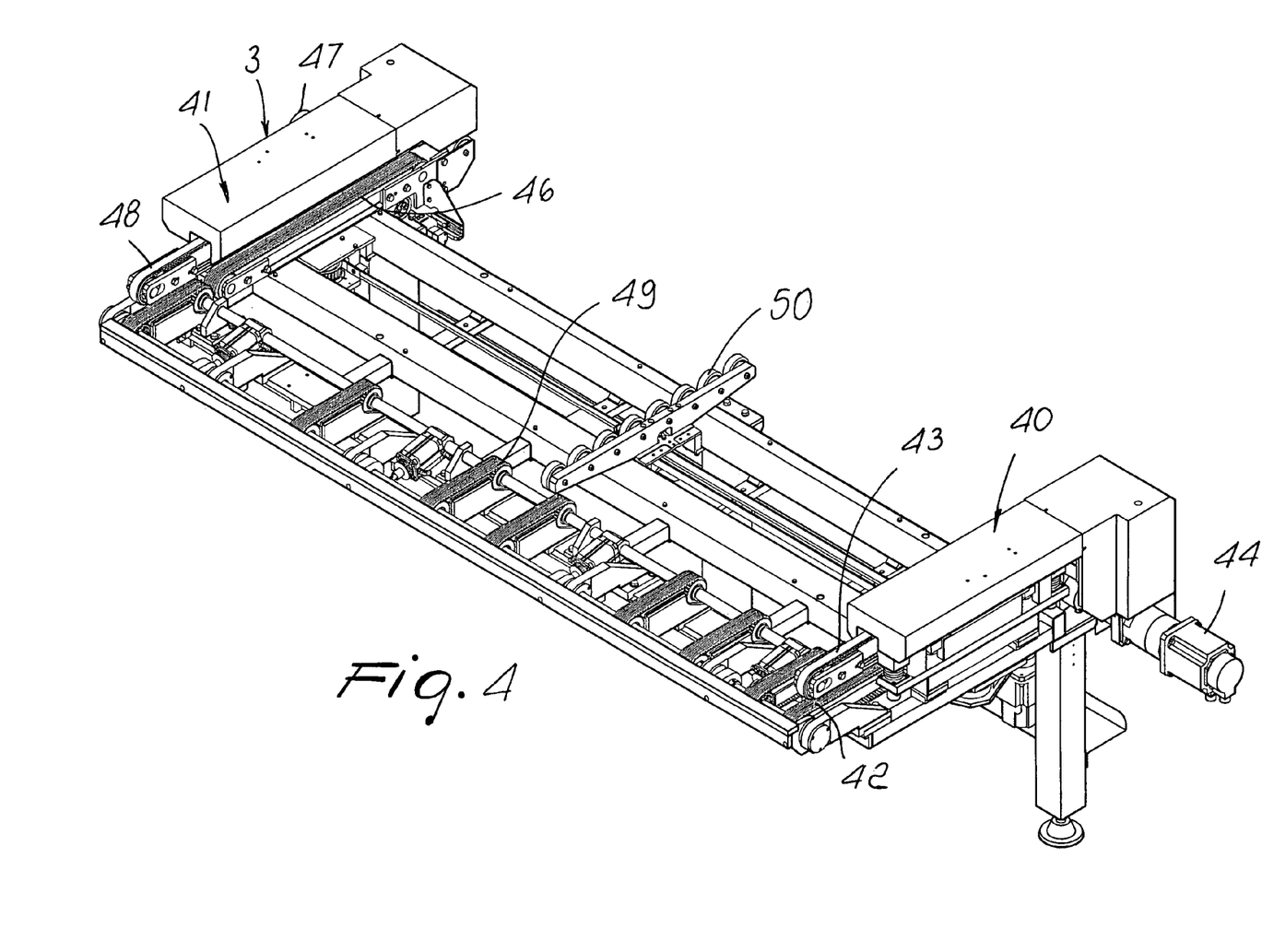
FIG. 4 is a schematic view of the sheet removal assembly.
Figure 5:
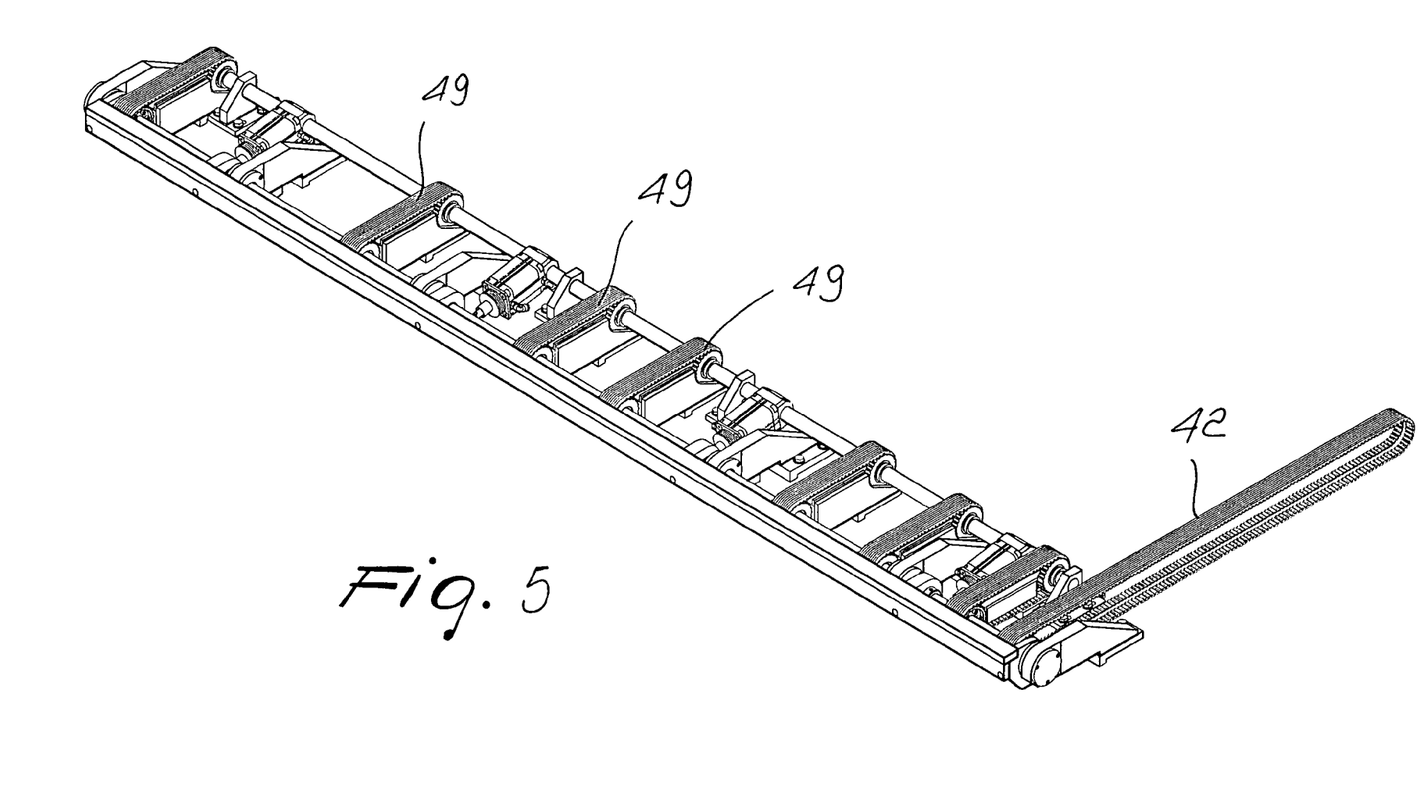
FIG. 5 is a view of a detail of the transverse conveyance element.
Figure 6:
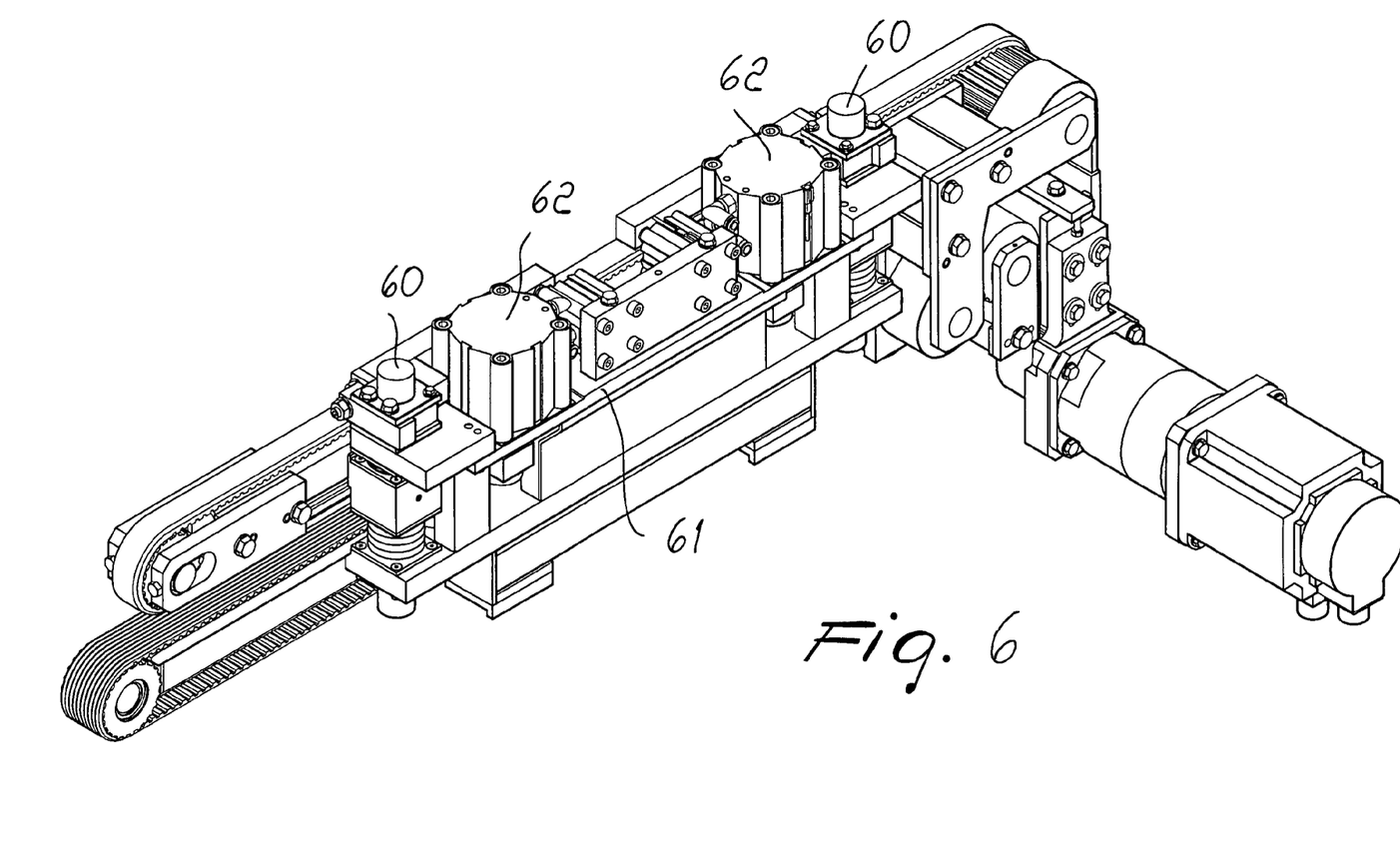
FIG. 6 is a perspective view of the fixed part of the removal assembly, taken from one side.
Figure 7:
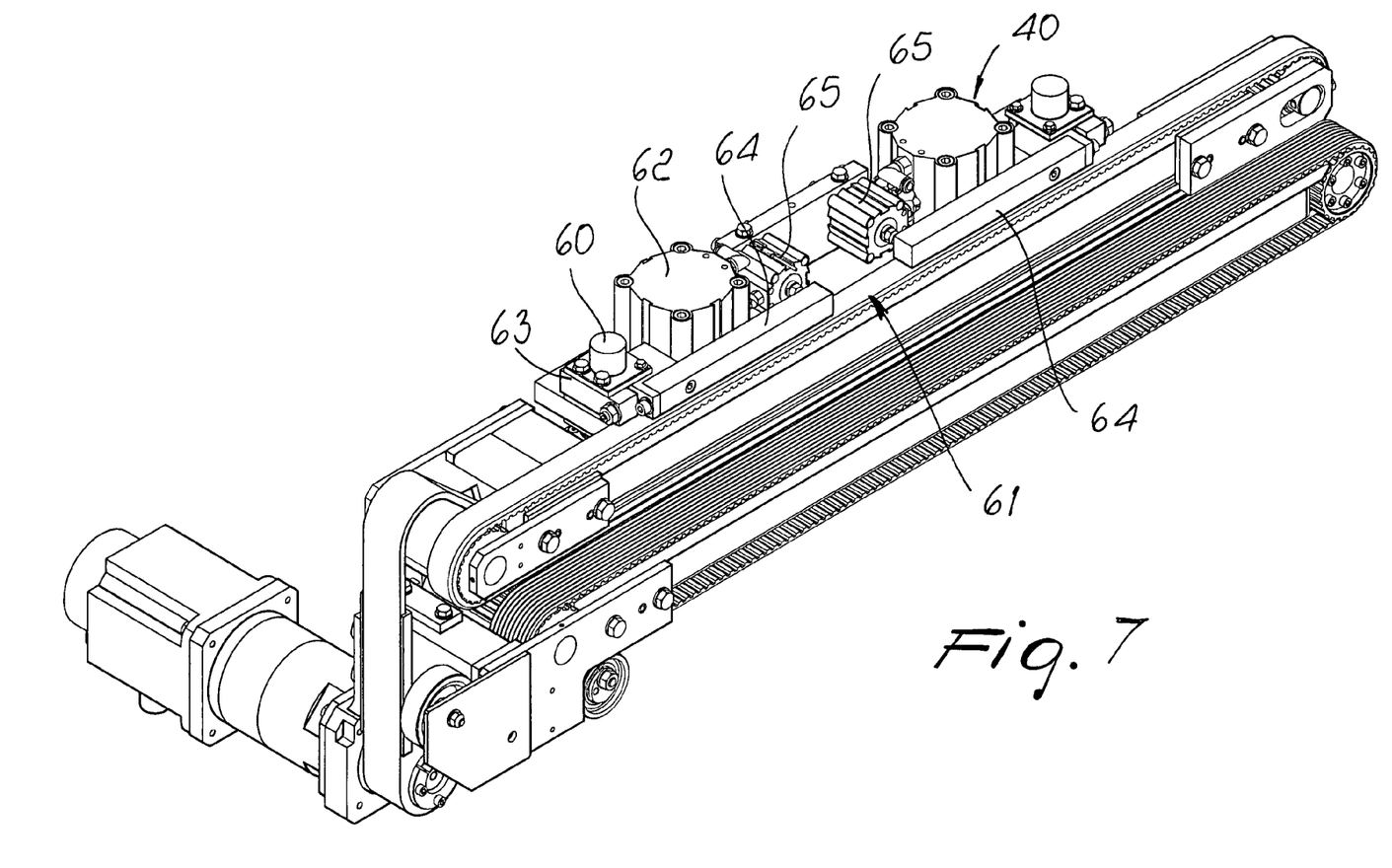
FIG. 7 is a view of the fixed part of the removal assembly, taken from the other side.
Figure 8:
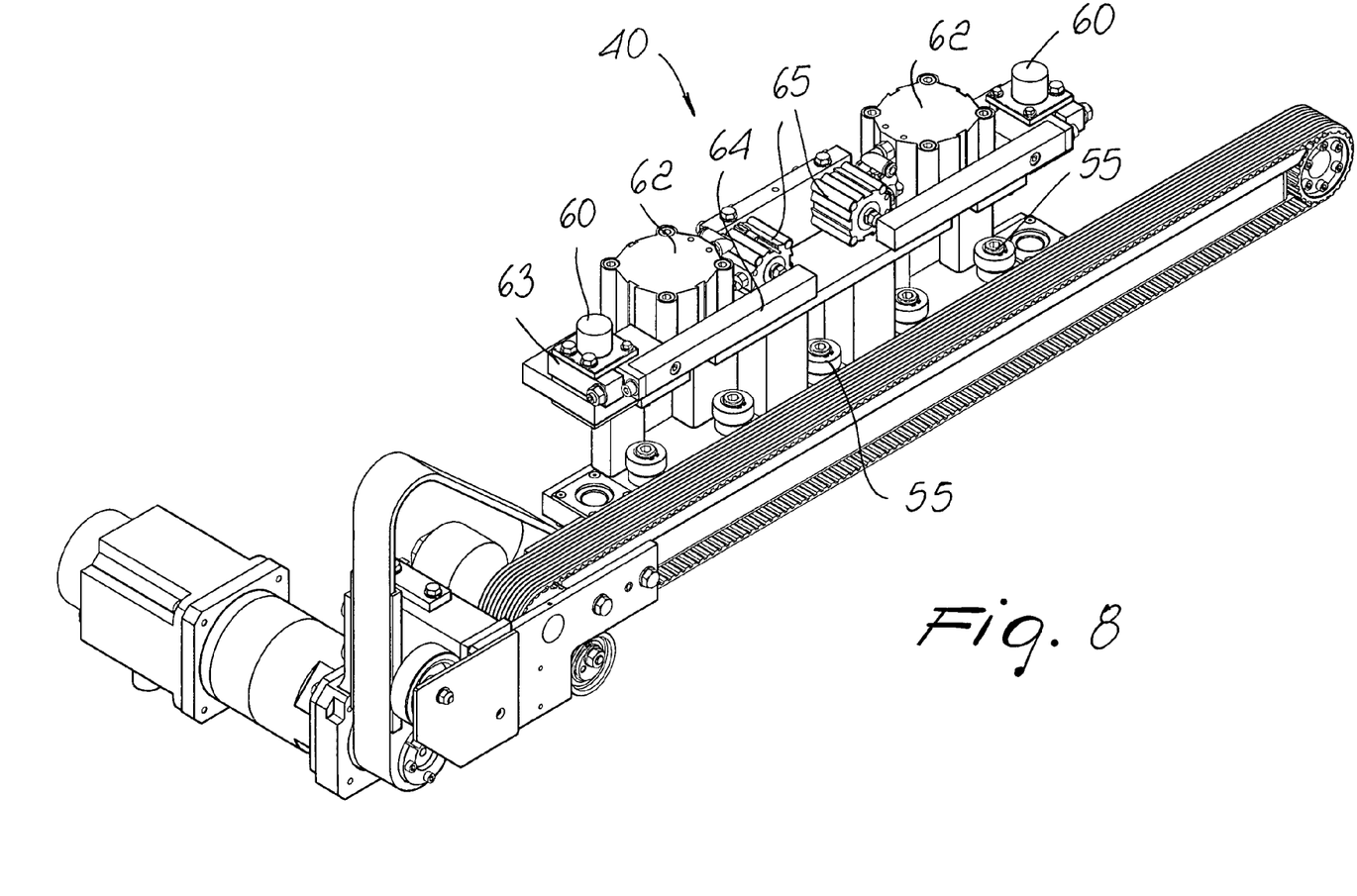
FIG. 8 is a view of a removal assembly, with the upper belt removed.
Figure 9:
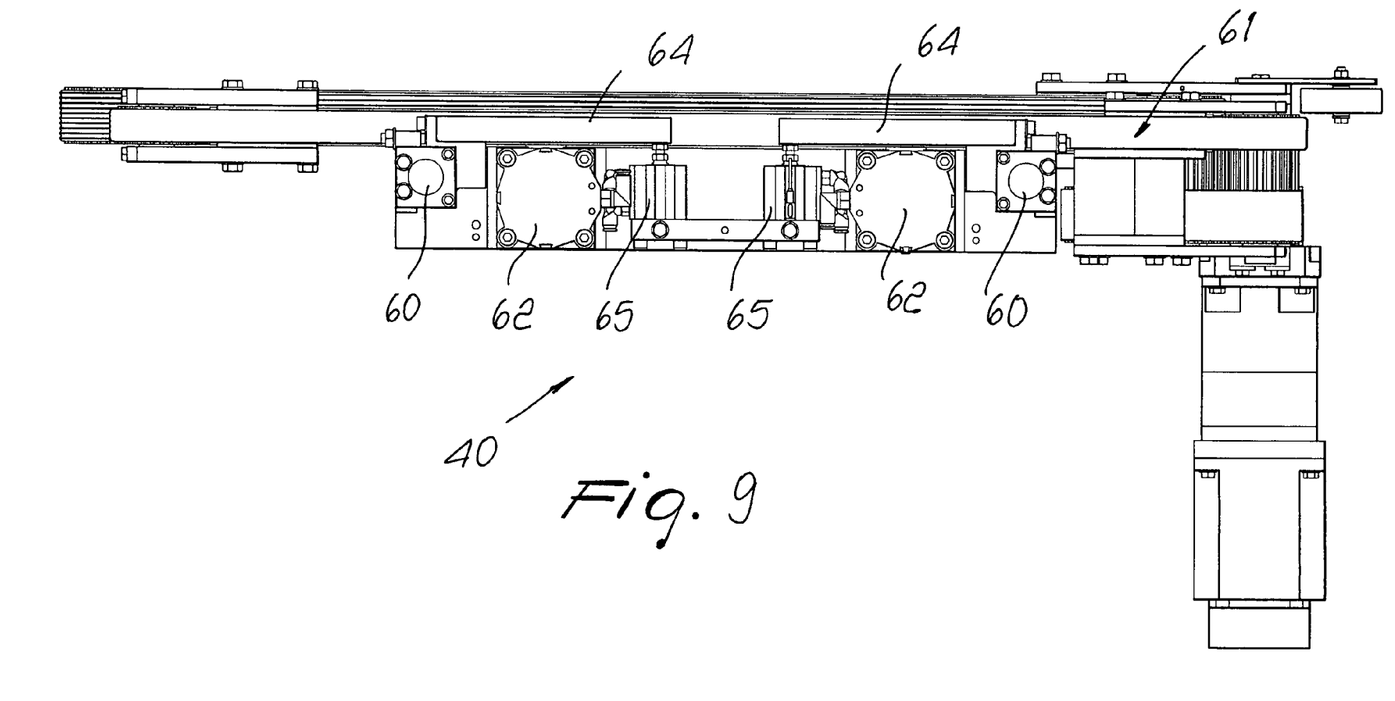
FIG. 9 is a plan view of a removal assembly.

With reference to the Figures, the assembly for conveying sheets on machines for working sheets, particularly glass sheets, generally designated by the reference numeral 1, comprises a sheet feeder assembly 2 and a sheet removal assembly 3, which are arranged respectively upstream and downstream of a working machine 4 which is interposed between the two removal assemblies.

In greater detail, there are also a sheet insertion assembly, designated by the reference numeral 6, which is provided by means of a conventional roller bed, and an output assembly, constituted by a roller bed 7 arranged at the output of the removal assembly.

A particular feature of the invention consists in that the sheet feeder assembly that engages the longitudinal edges of the sheets, where "longitudinal" refers to the direction of advancement of the sheets, is constitute by means of a supporting frame 10, which supports the elements that constitute the assembly, which is constituted by a pair of mutually opposite fixed-position belts 11, and a pair of mutually opposite variable-position belts 12, which can perform a translational motion toward and away from the pair of fixed-position belts in order to adapt to the width of the sheet.

The pairs of belts 11 and 12 are constituted respectively by a lower fixed-position feeder belt 13, which is actuated by a first motor 14, which moves the belt.

A controlled feeder belt 15 with adjustable position is positioned above the belt 13 and can perform a translational motion along a direction which is perpendicular to the plane of arrangement of the sheet, designated by the reference letter L, so as to adapt to the thickness of the sheet.

The belt 15 is actuated with positioning means which will be described hereinafter.

The variable-position belts 12 are provided with a lower, fixed-position, feeder belt 20, which lies below the sheet and is connected to and actuated by a second motor 21.

An adjustable upper feeder belt 22 is arranged above the belt 20, which can perform a translational motion on a direction perpendicular to the sheet arrangement plane, and can also be motorized or free.

The feeder assembly is completed by a transverse feeder roller 30, which engages the lower face of the sheet and in practice supports it along a transverse direction, i.e., at right angles to the extension of the longitudinal edges.

In this manner, the sheet is retained correctly in order to be fed below the working machine 4.

There is also a plurality of central rollers 32, which are designed to support large sheets and are arranged halfway along the width of the sheet.

Likewise, the removal assembly 3 is constituted by a pair of fixed-position removal belts 40, opposite to which there is a pair of variable-position removal belts 41, which like the pair of belts 12 can perform a translational motion in order to adapt to the different widths of the sheet.

The pairs of belts 40 and 41, in a manner similar to the pairs 11 and 12, are provided by means of a lower fixed-position removal belt 42, above which there is an adjustable upper removal belt 43. The belt 42 is connected to a third motor 44, while the belt 43 in this case also can be motorized or free.

Likewise, the pair of belts 41 is provided with a lower variable or movable-position belt 46, which is connected to a fourth motor 47, above which an adjustable removal belt 48 is arranged that can perform a translational motion along a direction perpendicular to the sheet arrangement plane.

The assembly is completed by a transverse roller 49, which engages along the transverse direction of the sheet, and a removal assembly formed of a series of central removal rollers 50, which support large sheets.

Each pair of belts 11, 12, 40 and 41 is arranged at rollers abutment 55 which have a vertical axis and are designed to act as an abutment and positioning element by engaging the edge of the sheet.

In order to adjust the position of the upper, adjustable belts, each pair of belts has a parallelogram mechanism 60, which supports the entire belt positioning means 61, on which a vertical actuation cylinder 62 is connected which makes the upper belts 15, 22, 43, 48 press against the upper surface of the glass sheet at the set pressure.

Once the belt has reached the intended position, a block 63 is actuated and acts on the stem of a cylinder 62, such block 63 constituting belt locking means for locking in position the adjustable belts.

It should also be added to the above that the upper belts have a covering provided by surface treatment which prevents damage of the surface layers sometimes provided on the upper face of the glass sheet.

With the arrangement described above, the working machine 4 is interposed advantageously between the feeder assembly and the removal assembly and supports one or more working heads, designated by the reference numeral 70, which can move along the transverse direction and can perform a translational motion at right angles to the plane of arrangement of the sheet.

With this arrangement it is therefore possible to work both on the longitudinal edges of the sheet and on its transverse edges, as well as on the upper surface of the sheet, since the sheet is always retained and moved perfectly and the positioning of the belts is independent of the positioning of the working heads, which are supported by the bridge frame, designated by the reference numeral 4a, which is interposed between the feeder assembly and the removal assembly which form the sheet conveyance assembly.

With the arrangement described above, the sheet is always retained perfectly in close proximity to the work area, thanks to the fact that the belts always engage the longitudinal edges of the sheet and there is also a roller which is positioned on the transverse edge and retains the sheet.

In practical operation, the sheet L to be worked is guided by means of the roller bed 6 which is located upstream of the feeder assembly and the sheet is already positioned with its longitudinal edges parallel to the advancement line and with its transverse edges at right angles.

One of the longitudinal edges is already positioned on the reference constituted by the rollers having a vertical axis.

Before the sheet engages the feeder assembly, the pairs of variable-positioning belts are positioned as a function of the size of the sheet, which is set by a numeric control, and when the sheet engages the pairs of belts along their length the movable pairs perform an additional stroke, which allows to generate a lateral pressure between the sheet L and the rollers 55 having a vertical axis, in order to ensure correct alignment of the sheet against the references.

Once the pairs of belts have been positioned according to the width of the sheet, the upper belts descend at the preset pressure, until the closure position is reached, as indicated by a pressure switch; the block 63 is activated and locks the upper structure, which can move at right angles to the plane of arrangement of the sheet.

Once the sheet has been locked between the upper and lower belts, such sheet is moved in the longitudinal direction in order to detect the transverse input edge by means of an electromechanical sensor.

Work then begins in which the assemblies or pairs of motorized belts allow the longitudinal movement of the sheet in the two directions of advancement, while the working heads move along the transverse direction and along the vertical direction, allowing any type of work.

When, during working, the sheet engages the removal assembly for a set length, the upper belts of the removal assembly descend at the preset pressure, and when the closure position indicated by a pressure switch is reached, the locking systems are activated as in the preceding case.

From what has been described above it is therefore evident that the invention achieves the proposed aim and objects, and in particular the fact is stressed that the use of two separate conveyance assemblies, i.e., the feeder assembly and the removal assembly, allows to work on any point of the sheet, since the working heads are in practice independent of the structure that provides the movement of the sheet and can move transversely and vertically.

When the working of the sheet has ended, the removal assembly moves away the sheet on the downstream roller bed.

The feeder and removal assemblies can move synchronously, typically during working, or at different speeds in order to move away a finished part and simultaneously set up a new part in input.

If the next sheet has the same thickness, the upper belts of both assemblies remain in position, thus reducing operating times.

The pneumatic movement system for the upper belts avoids the need to check their position as a function of the thickness of the glass sheet.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2005A001851 from which this application claims priority are incorporated herein by reference.

What is claimed is:

1. An assembly for conveying glass sheets on a machine for working sheets that comprises a frame for supporting at least one working head, comprising: a feeder assembly for feeding a sheet to be worked, which engages longitudinal edges of the sheet; and is arranged upstream of said working head supporting frame; and a removal assembly for removing the glass sheet, which engages the longitudinal edges thereof and is arranged downstream of said working head supporting frame, wherein said feeder assembly and said removal assembly each comprise two fixed-position belts and two variable-position belts that are suitable to adapt to a width of the glass sheet, and wherein said sheet feeder assembly comprises the two fixed-position belts and a first motor, a lower fixed-position feeder belt of which being actuated by said first motor; and a variable-position belt whose position is adjustable along a direction which is substantially perpendicular to a plane of arrangement of said glass sheet being positioned above said lower fixed-position feeder belt.

2. The conveyance assembly of claim 1, wherein said sheet feeder assembly and said sheet removal assembly comprise each a pair of mutually opposite belts, and wherein a pair of said belts is provided for each longitudinal edge of the glass sheet.

3. The conveyance assembly of claim 1, wherein said pair of variable-position feeder belts is provided wit a lower fixed-position feeder belt, with a second motor for actuation thereof and with an upper adjustable-position belt, which is adapted to perform a translational motion along a direction which is substantially perpendicular to a plane of arrangement of the glass sheet.

4. The conveyance assembly of claim 3, wherein said pair of fixed-position removal belts comprises a lower fixed-position removal belt, and an upper adjustable removal belt adapted to pertorm a translational motion along a direction at right angles to a plane of arrangement of the glass sheet.

5. The conveyance assembly of claim 4, wherein said pair of variable-position removal belts comprises a lower movable-position removal belt, a fourth motor for actuation thereof, and an upper adjustable removal belt, which is adapted to perform a translational motion along a direction which is substantially perpendicular to the plane of arrangement of the glass sheet.

6. The conveyance assembly of claim 5, wherein each of said upper belts has a covering adapted to prevent damage of surface layers of a glass sheet being worked.

7. The conveyance assembly of claim 5, comprising: a transverse roller for said feeder assembly and for said removal assembly, which is adapted to engage a lower face of the glass sheet along a substantially transverse direction substantially at right angles to said longitudinal direction.

8. The conveyance assembly of claim 7, comprising a series of central rollers, for said feeder assembly and for said removal assembly which are positionable substantially in a central portion of the width of the glass sheet being worked.

9. The conveyance assembly of claim 8, comprising abutment rollers having a vertical axis and being positioned at each said pair of belts, to act as an abutment and positioning element by engaging the one of said edges of the sheet that is worked.

10. The conveyance assembly of claim 1, comprising positioning means for said variable-position adjustable belts, said positioning means comprising a support for a frame of a corresponding one of said belts, actuation cylinders that are positioned on said belt frame and are adapted to make said adjustable belts press against a surface of a glass sheet being worked.

11. The conveyance assembly of claim 10, further comprising locking means for locking said variable-position adjustable belts in position.

12. The conveyance assembly of claim 1, comprising a free space, provided between said feeder assembly and said removal assembly, in order to position said frame for supporting at least one working head.

13. The conveyance assembly of claim 1, comprising an assembly for conveying said at least one working head that comprises a bridge frame, which supports said at least one working head, said bridge frame being adapted to perform a translational motion along a substantially transverse direction.

14. An assembly for conveying glass sheets on a machine for working sheets tat comprises a frame for supporting at least one working head, comprising: a feeder assembly for feeding a sheet to be worked, which engages longitudinal edges of the sheet; and is arranged upstream of said working head supporting frame; and a removal assembly for removing the glass sheet, which engages the longitudinal edges thereof and is arranged downstream of said working head supporting frame, wherein said feeder assembly and said removal assembly each comprise two fixed-position belts and two variable-position belts that are suitable to adapt to a width of the glass sheet and wherein said pair of variable-position feeder belts is provided with a lower fixed-position feeder belt, with a second motor for actuation thereof and with an upper adjustable-position belt, which is adapted to perform a translational motion along a direction which is substantially perpendicular to a plane of arrangement of the glass sheet.

15. The conveyance assembly of claim 14, wherein said sheet feeder assembly and said sheet removal assembly comprise each a pair of mutually opposite belts, and wherein a pair of said belts is provided for each longitudinal edge of the glass sheet.

16. The conveyance assembly of claim 14, wherein said sheet feeder assembly comprises the two fixed-position belts and a first motor, a lower fixed-position feeder belt of which being actuated by said first motor; and a variable-position belt whose position is adjustable along a direction which is substantially perpendicular to a plane of arrangement of said glass sheet being positioned above said lower fixed-position feeder belt.

17. The conveyance assembly of claim 16, comprising positioning means for said variable-position adjustable belts, said positioning means comprising a support for a frame of a corresponding one of said belts, actuation cylinders that are positioned on said belt frame and are adapted to make said adjustable belts press against a surface of a glass sheet being worked.

18. The conveyance assembly of claim 17, further comprising locking means for locking said variable-position adjustable belts in position.

19. The conveyance assembly of claim 14, wherein said pair of fixed-position removal belts comprises a lower fixed-position removal belt, and an upper adjustable removal belt adapted to perform a translational motion along a direction at right angles to a plane of arrangement of the glass sheet.

20. The conveyance assembly of claim 19, wherein said pair of variable-position removal belts comprises a lower movable-position removal belt, a fourth motor for actuation thereof, and an upper adjustable removal belt, which is adapted to perform a translational motion along a direction which is substantially perpendicular to the plane of arrangement of the glass sheet.

21. The conveyance assembly of claim 20, comprising: a transverse roller for said feeder assembly and for said removal assembly, which is adapted to engage a lower face of the glass sheet along a substantially transverse direction substantially at right angles to said longitudinal direction.

22. The conveyance assembly of claim 21, comprising a series of central rollers, for said feeder assembly and for said removal assembly which are positionable substantially in a central portion of the width of the glass sheet being worked.

23. The conveyance assembly of claim 22, comprising abutment rollers having a vertical axis and being positioned at each said pair of belts, to act as an abutment and positioning element by engaging the one of said edges of the sheet that is worked.

24. The conveyance assembly of claim 20, wherein each of said upper belts has a covering adapted to prevent damage of surface layers of a glass sheet being worked.

25. The conveyance assembly of claim 14, comprising a free space, provided between said feeder assembly and said removal assembly, in order to position said frame for supporting at least one working head.

26. The conveyance assembly of claim 14, comprising an assembly for conveying said at least one working head that comprises a bridge frame, which supports said at least one working head, said bridge frame being adapted to perform a translational motion along a substantially transverse direction.

27. An assembly for conveying glass sheets on a machine for working sheets tat comprises a frame for supporting at least one working head, comprising: a feeder assembly for feeding a sheet to be worked, which engages longitudinal edges of the sheet; and is arranged upstream of said working head supporting frame; and a removal assembly for removing the glass sheet, which engages the longitudinal edges thereof and is arranged downstream of said working head supporting frame, wherein said feeder assembly and said removal assembly each comprise two fixed-position belts and two variable-position belts that are suitable to adapt to a width of the glass sheet, and further comprising a free space, provided between said feeder assembly and said removal assembly, in order to position said frame for supporting at least one working head.

28. The conveyance assembly of claim 27, wherein said sheet feeder assembly and said sheet removal assembly comprise each a pair of mutually opposite belts, and wherein a pair of said belts is provided for each longitudinal edge of the glass sheet.

29. The conveyance assembly of claim 27, wherein said sheet feeder assembly comprises the two fixed-position belts and a first motor, a lower fixed-position feeder belt of which being actuated by said first motor; and a variable-position belt whose position is adjustable along a direction which is substantially perpendicular to a plane of arrangement of said glass sheet being positioned above said lower fixed-position feeder belt.

30. The conveyance assembly of claim 27, wherein said pair of variable-position feeder belts is provided with a lower fixed-position feeder belt, with a second motor for actuation thereof and with an upper adjustable-position belt, which is adapted to perform a translational motion along a direction which is substantially perpendicular to a plane of arrangement of the glass sheet.

31. The conveyance assembly of claim 30, wherein said pair of fixed-position removal belts comprises a lower fixed-position removal belt and an upper adjustable removal belt adapted to perform a translational motion along a direction at right angles to a plane of arrangement of the glass sheet.

32. The conveyance assembly of claim 31, wherein said pair of variable-position removal belts comprises a lower movable-position removal belt, a fourth motor for actuation thereof, and an upper adjustable removal belt, which is adapted to perform a translational motion along a direction which is substantially perpendicular to the plane of arrangement of the glass sheet.

33. The conveyance assembly of claim 32, wherein each of said upper belts has a covering adapted to prevent damage of surface layers of a glass sheet being worked.

34. The conveyance assembly of claim 32, comprising: a transverse roller for said feeder assembly and for said removal assembly, which is adapted to engage a lower face of the glass sheet along a substantially transverse direction substantially at right angles to said longitudinal direction.

35. The conveyance assembly of claim 34, comprising a series of central rollers, for said feeder assembly and for said removal assembly which are positionable substantially in a central portion of the width of the glass sheet being worked.

36. The conveyance assembly of claim 35, comprising abutment rollers having a vertical axis and being positioned at each said pair of belts, to act as an abutment and positioning element by engaging the one of said edges of the sheet that is worked.

37. The conveyance assembly of claim 29, comprising positioning means for said variable-position adjustable belts, said positioning means comprising a support for a frame of a corresponding one of said belts, actuation cylinders that are positioned on said belt frame and are adapted to make said adjustable belts press against a surface of a glass sheet being worked.

38. The conveyance assembly of claim 37, further comprising locking means for locking said variable-position adjustable belts in position.

39. The conveyance assembly of claim 27, comprising a free space, provided between said feeder assembly and said removal assembly, in order to position said frame for supporting at least one working head.

40. The conveyance assembly of claim 27, comprising an assembly for conveying said at least one working head that comprises a bridge frame, which supports said at least one working head, said bridge flame being adapted to perform a translational motion along a substantially transverse direction.

* * * * *